US006739973B1

(12) United States Patent
Lucchesi et al.

(10) Patent No.: US 6,739,973 B1
(45) Date of Patent: May 25, 2004

(54) GAMING DEVICE HAVING CHANGED OR GENERATED PLAYER STIMULI

(75) Inventors: Matthew Lucchesi, Reno, NV (US); Jason D. Kremer, Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 09/686,244

(22) Filed: Oct. 11, 2000

(51) Int. Cl.[7] ................................................ A63F 13/00
(52) U.S. Cl. .............................. 463/35; 463/30; 463/16
(58) Field of Search ......................... 463/16–20, 30–35; 273/138.1, 143 R, 269, 292

(56) References Cited

U.S. PATENT DOCUMENTS

| | | | | | |
|---|---|---|---|---|---|
| 3,831,172 | A | * | 8/1974 | Olliges et al. | 273/454 |
| 4,314,236 | A | * | 2/1982 | Mayer et al. | 340/384.71 |
| 4,695,053 | A | | 9/1987 | Vazquez, Jr. et al. | 273/143 R |
| 5,342,047 | A | | 8/1994 | Heidel et al. | 273/85 CP |
| 5,390,938 | A | * | 2/1995 | Takeya | 463/35 |
| 5,393,061 | A | * | 2/1995 | Manship et al. | 463/20 |
| 5,449,173 | A | | 9/1995 | Thomas et al. | 273/143 R |
| 5,472,197 | A | | 12/1995 | Gwiasda et al. | |
| 5,695,188 | A | | 12/1997 | Ishibashi | 273/143 R |
| 5,697,843 | A | * | 12/1997 | Manship et al. | 273/143 R |
| 5,707,286 | A | | 1/1998 | Carlson | 463/16 |
| 5,758,875 | A | | 6/1998 | Giacalone, Jr. | |
| 5,762,552 | A | * | 6/1998 | Vuong et al. | 463/17 |
| 5,766,074 | A | | 6/1998 | Cannon et al. | 463/16 |
| 5,772,509 | A | | 6/1998 | Weiss | 463/16 |
| 5,833,538 | A | | 11/1998 | Weiss | 463/21 |
| 5,908,354 | A | * | 6/1999 | Okuniewicz | 273/143 R |
| 5,910,048 | A | | 6/1999 | Feinberg | 463/25 |
| 5,997,401 | A | | 12/1999 | Crawford | 463/20 |
| 6,015,346 | A | | 1/2000 | Bennett | 463/20 |
| 6,056,642 | A | | 5/2000 | Bennett | 463/20 |
| 6,071,192 | A | | 6/2000 | Weiss | 463/3 P |
| 6,102,400 | A | | 8/2000 | Scott et al. | 273/269 |
| 6,106,393 | A | * | 8/2000 | Sunaga et al. | 273/138.2 |
| 6,110,041 | A | | 8/2000 | Walker et al. | 463/20 |
| 6,113,495 | A | | 9/2000 | Walker et al. | 463/42 |
| 6,117,009 | A | * | 9/2000 | Yoseloff | 463/20 |
| 6,126,165 | A | | 10/2000 | Sakamoto | 273/143 R |
| 6,142,875 | A | | 11/2000 | Kodachi et al. | 463/20 |
| 6,155,925 | A | | 12/2000 | Giobbi et al. | 463/20 |
| 6,159,097 | A | | 12/2000 | Gura | 463/20 |
| 6,174,233 | B1 | | 1/2001 | Sunaga et al. | 463/20 |
| 6,174,235 | B1 | | 1/2001 | Walker et al. | 463/25 |
| 6,238,288 | B1 | * | 5/2001 | Walker et al. | 463/26 |
| 6,328,648 | B1 | | 12/2001 | Walker et al. | |
| 6,416,411 | B1 | * | 7/2002 | Tsukahara | 273/121 B |

FOREIGN PATENT DOCUMENTS

| | | | | | |
|---|---|---|---|---|---|
| GB | 2 201 279 | A | | 8/1988 | G07F/17/34 |
| JP | 10272220 | A | * | 10/1998 | A63F/5/04 |

OTHER PUBLICATIONS

Description of Accelerated Credit Roll–Up in Gaming Machines.

Descriptions of Volume Control Functions in Gaming Machines.

(List continued on next page.)

*Primary Examiner*—Scott E. Jones
(74) *Attorney, Agent, or Firm*—Bell, Boyd & Lloyd LLC

(57) ABSTRACT

A gaming device having at least one changed player stimuli and a method of changing player stimuli associated with a player input device are disclosed for enhancing a player's interest, excitement, length of play, and enjoyment of the casino gaming experience while operating the gaming device. The gaming device comprises of at least one player input device and generates player stimuli after each activation of the player input device. The gaming device changes the player stimuli when a predetermined number of consecutive activations of the player input device is reached. The player stimuli may also change when a predetermined number of consecutive activations of the player input device occurs in a predetermined period of time.

87 Claims, 4 Drawing Sheets

OTHER PUBLICATIONS

Top Dollar Brochure written by IGT published in 1998.

Wheel of Fortune Brochure written by IGT published 1998.

Description of Lighting Features in Gaming Machines.

Description of Action Prompts in Gaming Machines.

Run For Your Money Brochure written by IGT published 1998.

Monopoly Brochures and Articles written by WMS Gaming, Inc. published in 1998, 1999, and 2000.

Description of Maximum Wager Sound and Bet Sounds in Gaming Devices written by IGT, available prior to 2000.

* cited by examiner

GAMING DEVICE HAVING CHANGED OR GENERATED PLAYER STIMULI

CROSS-REFERENCE TO RELATED APPLICATIONS

This application is related to the following commonly-owned patent applications: "GAMING DEVICE WITH AWARD AND DEDUCTION PROXIMITY-BASED SOUND EFFECT FEATURE," Ser. No. 09/656,663, "GAMING DEVICE WITH MOVING SCREEN SIMULATION," Ser. No. 09/625,884, "GAMING DEVICE PROVIDING AUDIO WAGERING INFORMATION," Ser. No. 09/629,288, and "GAMING DEVICE FOR CHANGING A PLAYER'S ENVIRONMENT," Ser. No. 09/689,402.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device that enhances a player's interest, excitement, length of play and overall enjoyment of the gaming experience while operating the gaming device by changing or generating at least one stimulus presented to the player by the gaming device.

BACKGROUND OF THE INVENTION

Gaming devices in general are designed to attract a player to the device to offer a gaming experience, preferably over an extended period of time. Gaming devices generally attract players through the use of lights, colors, sounds, themes, awards, differing games and bonus games. Gaming devices also use video screens to increase a player's attraction to a game by offering more winning combinations. However, when a player plays such gaming devices, the gaming devices offer a repetitive gaming experience to the player (i.e., the game repeats the same individual or set of sounds, lights and other stimuli presented to the player.) This repetitive gaming experience is multiplied when a player repeatedly makes the same wager (as many players do) which consists of the same paylines or bet using a "repeat bet" button or a "max bet" button.

The player thereby constantly experiences the same audio, visual, audio-visual, or length of time stimuli of the gaming device. Known gaming devices which continually offer the same gaming experience in a repetitive fashion to the player causing the player to become lulled or bored while operating the gaming device. This in turn causes the player to lose interest in the gaming device.

Therefore, there is a need for a gaming device which enhances a player's interest, excitement, length of play and enjoyment of the gaming experience while repetitively playing a gaming device or repeatedly making the same wager or bet.

SUMMARY OF THE INVENTION

The present invention provides a gaming device which changes repetitive stimuli provided to a player when the player repeatedly plays the gaming device or repeatedly makes the same wager or bet to increase the player's interest, excitement, length of play, and overall enjoyment. The present invention monitors and temporarily stores player activity, specifically the player's wagers or bets. When a predetermined or random number of the same bets or wagers are made, the gaming device changes or generates at least one stimulus provided to the player. The change or generation of at least one player stimulus can be subtle or not subtle, and can be done in a predetermined or random fashion. Alternatively, the gaming device of the present invention could be adapted to monitor and temporarily store a predetermined period of time a player operates the gaming device and could change or generate at least one player stimulus based upon that period of time.

It is therefore an object of the present invention to provide a gaming device having at least one changed or generated player stimuli to increase a player's interest, excitement, length of play, and enjoyment of the gaming experience while operating the gaming device.

Other objects, features and advantages of the invention will be apparent from the following detailed disclosure, taken in conjunction with the claims and accompanying sheets of drawings, wherein like numerals refer to like parts, elements, components, steps and processes.

DETAILED DESCRIPTION OF THE INVENTION

Gaming Device and Electronics

Figure 1A:
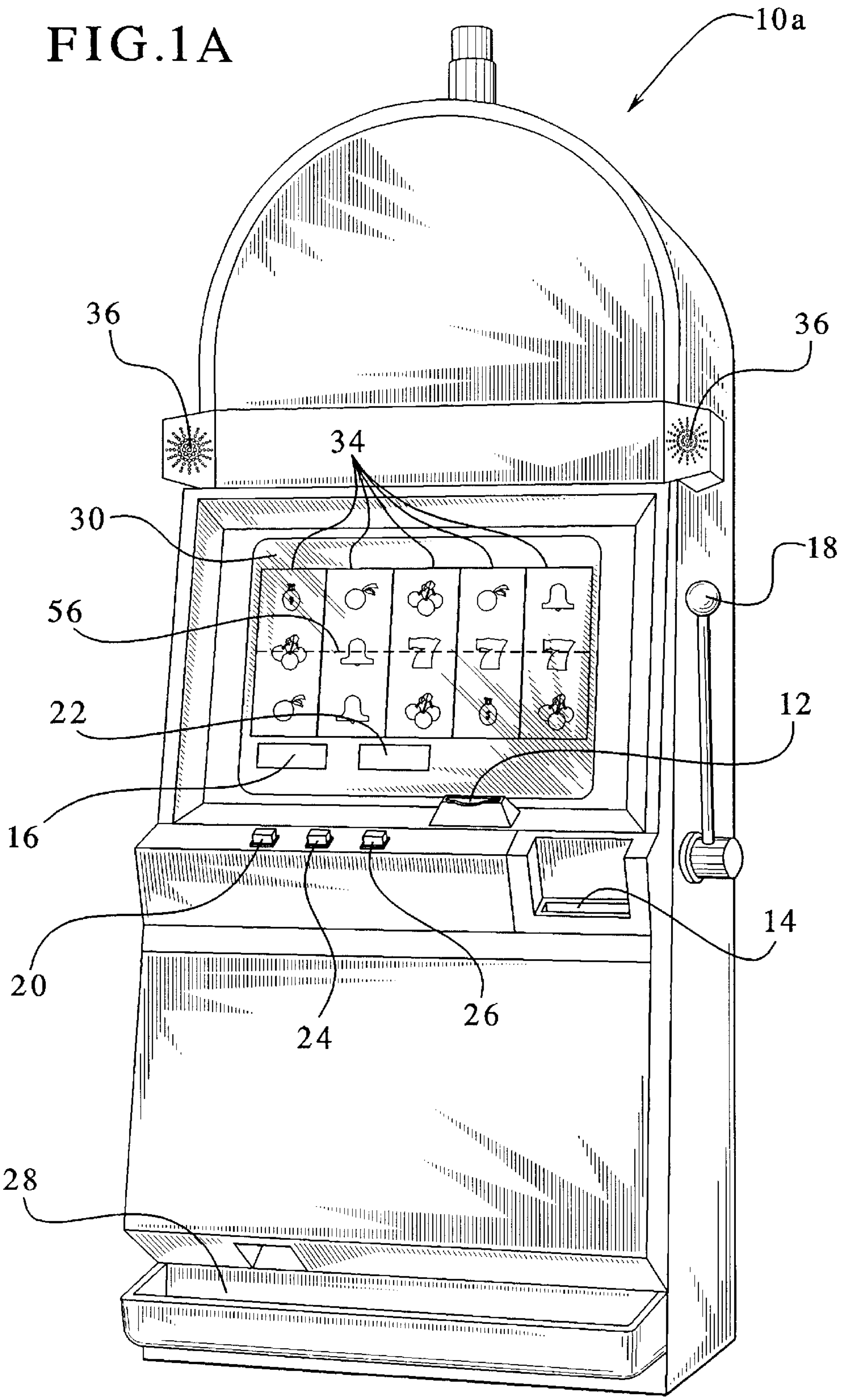
FIG. 1A is a front plan view of the general configuration of the gaming device of the present invention.
Figure 1B:
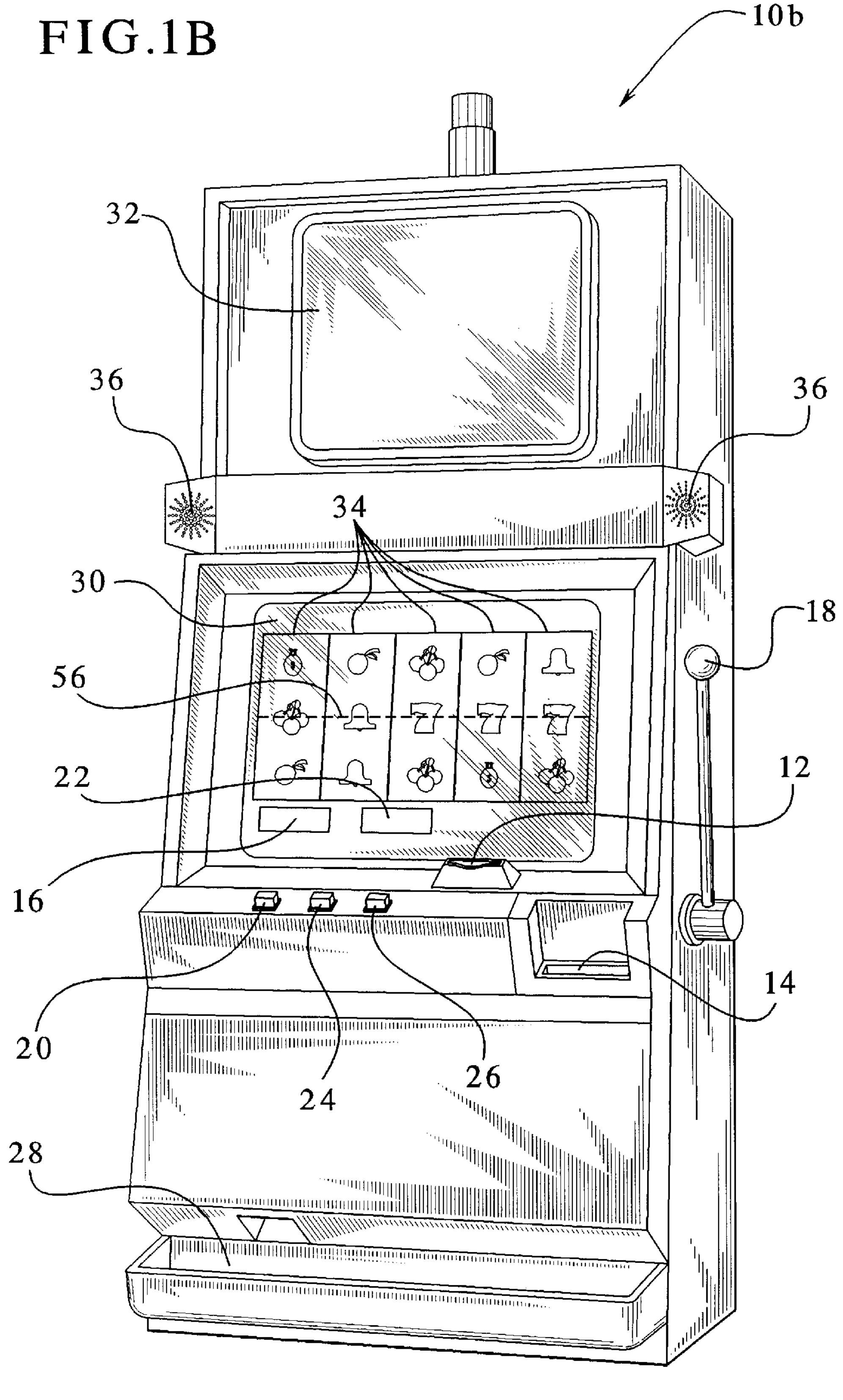
FIG. 1B is a front plan view of an alternative embodiment of the general configuration of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker or keno, any of their bonus triggering events and any of their bonus round games. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or a ticket voucher in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time during the game, a player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. However, it should be appreciated that the display devices can display any visual representation or exhibition, including but not limited to, movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
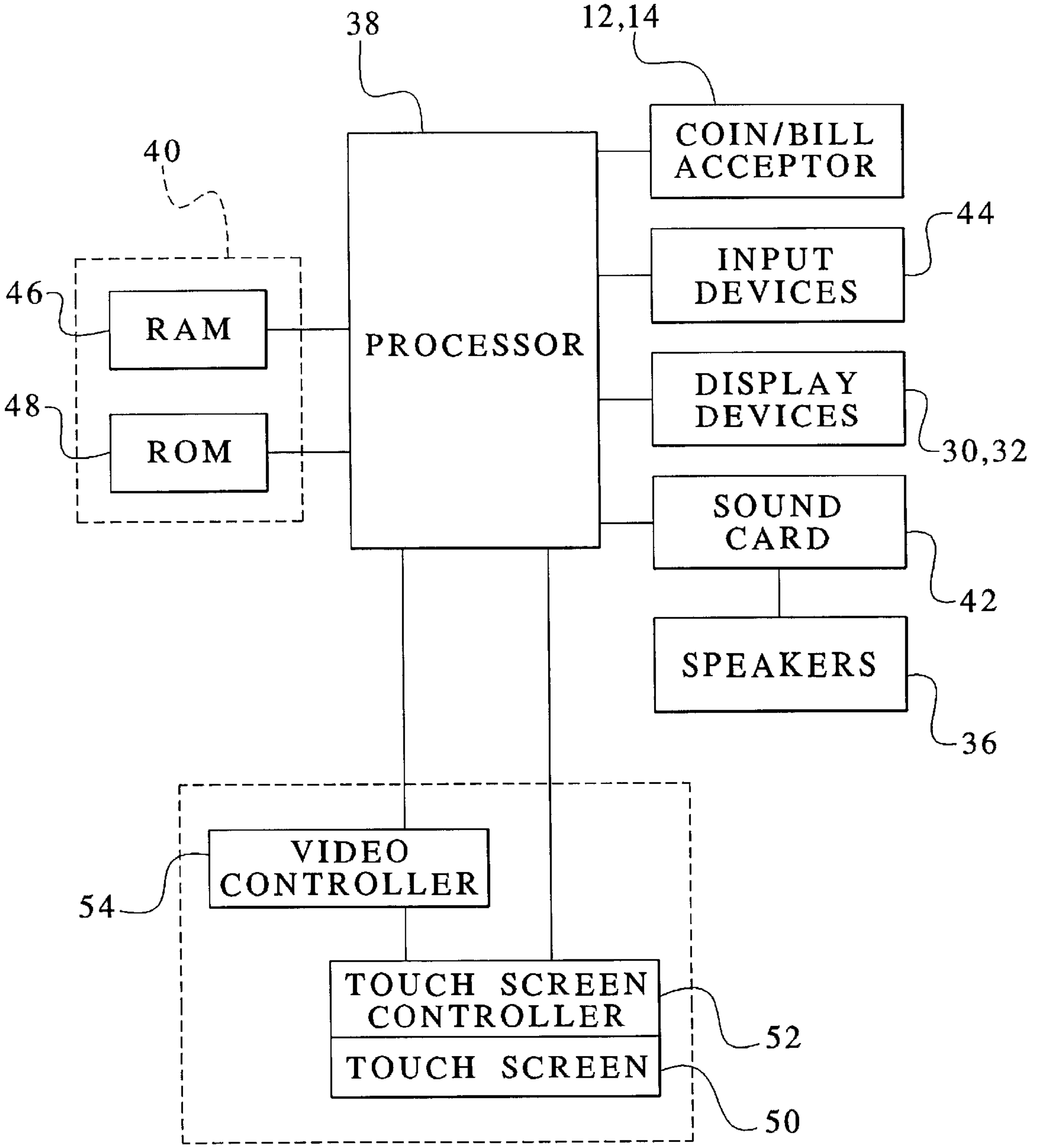
FIG. 2 is a schematic block diagram of the general electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances, it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 together are generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, gaming device 10 may also provide players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof. The present invention may be employed in a primary, secondary or bonus game of a gaming machine.

Gaming Device Apparatus Having at Least one Changed or Generated Player Stimulus The present invention includes a gaming device 10 which enhances the interest, excitement, length of play, and enjoyment of the gaming experience for a player operating gaming device 10 by changing or generating at least one player stimulus after a predetermined or random number of wagers or bets has been inputted into gaming device 10 by the player. To do so, the gaming device 10 monitors and temporarily stores the player's wagers or bets which the player inputs into gaming device 10 using one or more of input devices 44 as can be seen in FIG. 2.

Based on the number of consecutive activations of input device 44, the gaming device 10 changes or generates at least one player stimuli after a predetermined or random number of those consecutive activations has been inputted into the gaming device. The changed or generated stimulus may be subtly or not subtly perceptible by the player and can be displayed or generated from gaming device 10 in a predetermined or random fashion. The player stimuli can include, but are not limited to, at least one changed or generated light, display, sound, and timing or speed of the gaming device. Thus, such player stimuli can be an auditory, visual, audio-visual, or length of time stimulus and combinations thereof.

Figure 3:
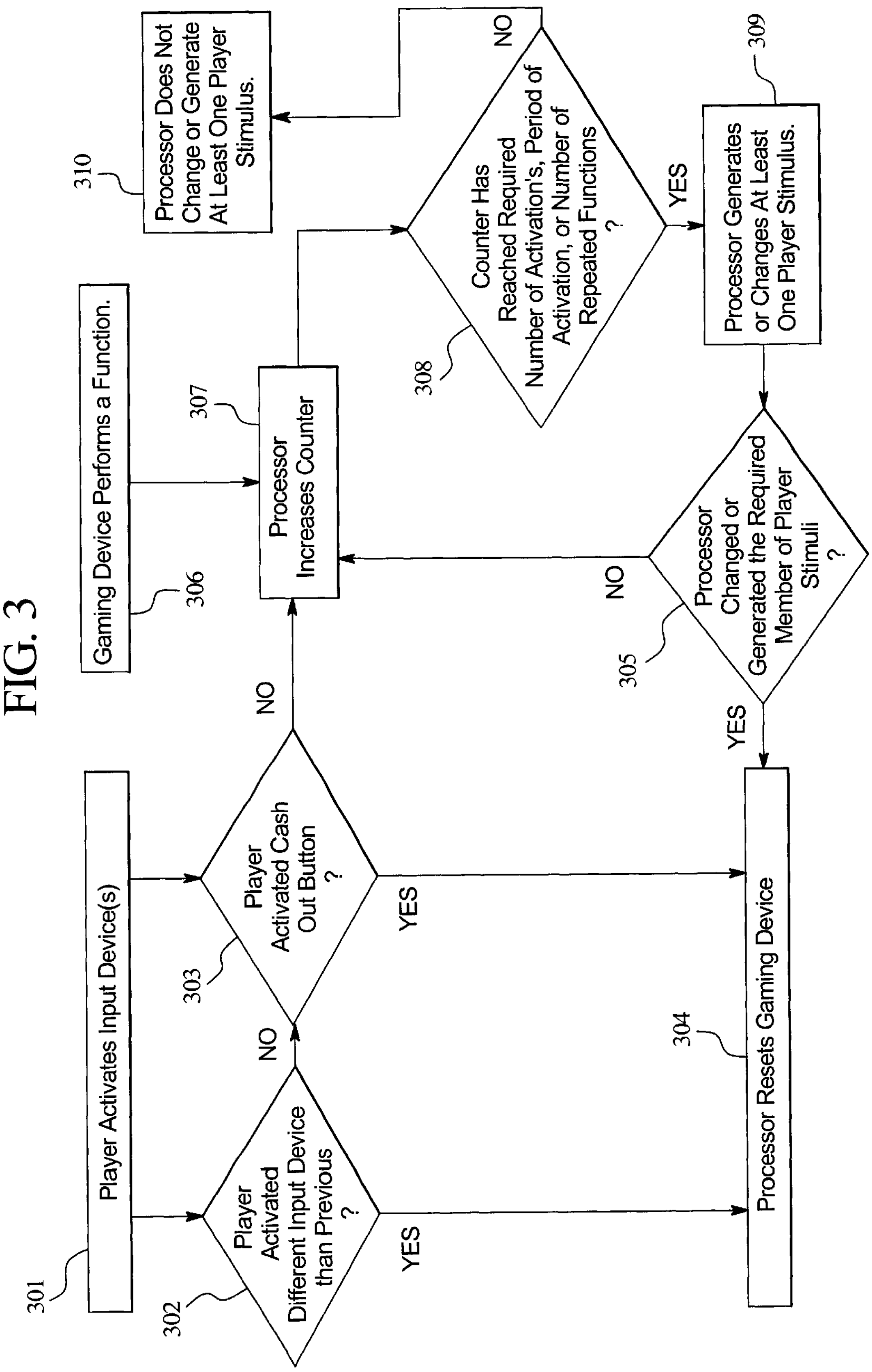
FIG. 3 is a flowchart illustrating the steps of operating the gaming device of the present invention.

The general steps of operating gaming device 10 according to the principles of the present invention are illustrated in the flowchart of FIG. 3. In one embodiment of the present invention, the player activates the input device as shown in block 301. If the player has not activated a different input device as illustrated by diamond 302 or the cash out button as illustrated by diamond 303, the processor increases the counter as shown by block 307. The processor also increases the counter after the gaming device performs a function as illustrated in block 306. If the counter has not reached the required number of activations, period of activation, or number of repeated functions as illustrated in diamond 308, the processor does not change or generate at least one player stimulus as illustrated in block 310. If the counter has reached the required number of activations, period of activation, or number of repeated functions then the processor generates or changes at least one player stimulus as illustrated in block 309. If the processor has not changed or generated the required member of player stimuli as illustrated in diamond 305 then the processor increases the counter as shown in block 307. If the processor changed or generated the required member of the player stimuli then the processor resets the gaming device as illustrated in block 304. In the preferred embodiment of gaming device 10, the gaming device resets itself when a reset mechanism such as the cash out button 26 is activated by the player or when a player activates a different input device other than the previous one as indicated in block 304. When the gaming device 10 is reset, the gaming device preferably defaults to the basic game stimuli.

It should be appreciated that while the cash out button 26 is one preferred form of the reset mechanism within gaming device 10, other reset mechanisms could be employed within gaming device 10. Such mechanisms can include, but are not limited to, for instance, activation of at least one different input device 44 (FIG. 2) than immediately previously inputted by the player or a predetermined number of at least one of the changed or generated player stimuli occurring to subsequently trigger processor 38 to reset gaming device 10.

The input devices 44 are preferably monitored by gaming device 10 or via the controller and can include, but are not limited to: cash out button 26, play button 20, bet one button 24, bet max button 52, bet per line button 54, and at least one bet amount button 58. The gaming device can include other conventional input mechanisms such as a repeat bet button.

The predetermined number of consecutive activations of at least one type of input mechanism 44 inputted into gaming device 10 (which preferably ranges from about 10 activations to about 25 activations or greater, but can be one or more activations) causes processor 38 to change at least one player stimulus already provided to the player or to generate at least one different player stimulus. For example, if a player activates input device 44 in the form of bet max button 52 ten times, processor 38 monitoring and temporarily storing such activations in conjunction with memory device 40 changes or generates at least one player stimulus as a response to that number of activations equaling the predetermined number of activations required to cause activation of processor 38 and memory device 40.

Alternatively, if a first player were to activate input mechanism 44 in the form of bet max button 52 five times, such a number of activations being monitored and stored by processor 38 in conjunction with memory device 40 would not be equal to the predetermined number of activations i.e., ten, required to cause processor 38 and memory device 40 to change or generate at least one player stimulus or combinations thereof. Yet, if the first player or a subsequent player completes the required predetermined number of activations, then processor 38 would change or generate at least one audio, visual, audio-visual, or length of time stimulus as well as combinations thereof to enhance the player's excitement, interest, length of play, and enjoyment of the gaming experience while operating gaming device 10.

It should be appreciated by those skilled in the gaming device art, however, that the number of consecutive activations of at least one type of input device 44 required to cause processor 38 to change or generate at least one player stimuli can be a random number generated by the controller of gaming device 10 rather than some previously established predetermined number.

With respect to the changed or generated stimuli of the preferred embodiment, the stimuli can be at least one audio stimulus, visual stimulus, audio-visual stimulus, length of time stimulus, and combinations thereof. It should be appreciated by those skilled in the art that when gaming device 10 or processor 38 changes or generates at least one player stimulus, the change or generation of that stimulus can be done in a predetermined or random fashion.

For example, processor 38 once triggered by the predetermined or random number of activations inputted into gaming device 10 could first change an auditory stimulus and then a visual stimulus and continue that pattern of change in a predetermined fashion. Alternatively, processor 38 once triggered could randomly change or generate any of the player stimuli of gaming device 10 rather than doing so in some predetermined sequence or order.

It should be appreciated by one skilled in the gaming device art that the present invention contemplates changing or generating not just one stimulus via gaming device 10 or processor 38, but also a plurality of stimuli. Further, the present invention also contemplates that processor 38 can change or generate at least one audio, visual, audio-visual, length of time stimulus or combinations thereof at the same time or at different times.

Preferably, the auditory stimulus includes, but is not limited to, at least one of the following examples: a changed reel spin sound, a changed reel stop sound, a changed input mechanism activation sound, a changed audio clip generated by gaming device 10, a changed reel speed sound, and combinations thereof.

Preferably, the visual stimulus includes, but is not limited to, at least one of the following examples: a changed reel speed, a change in lighting of one or more reels 34, a changed lighting scheme of gaming device 10, a flashing light, an alternating light, a changed reel symbol, display of a static image, a changed display of a static image, display of a motion picture, changed display of a motion picture, and combinations thereof.

Preferably, the length of time stimulus is a shortened reel spin time or changed reel spin speed.

In an alternative embodiment of the present invention, gaming device 10 enhances the player's interest, excitement, length of play, and enjoyment of the gaming experience for an extended period of time by monitoring and temporarily storing player activations of at least one input device 44 during a period of time (preferably displayed upon display device 32 and activated through touch screen 50) to cause processor 38 to change or generate at least one player stimulus or combinations thereof upon display device 32 and/or generated from speakers 36 if a predetermined number of those activations occurs during that period of time. The input mechanisms, reset mechanisms, and stimuli of the preferred embodiment are equally applicable to this alternative embodiment.

The triggering event to cause processor 38 to change or generate at least one stimulus is the activation of at least one input device 44 for a predetermined period of time. Preferably, the predetermined period of time activating at least one input device 44 is about ten seconds or greater.

For example, a player of gaming device 10 activates input mechanism 44 in the form of bet one button 24 for a period of five minutes or greater. In doing so, processor 38 monitoring and temporarily storing such a period of activation in conjunction with memory device 40, recognizes that the predetermined period of activation has been reached and subsequently changes or generates at least one audio, visual, audio-visual, or length of time stimulus or combinations thereof.

In another alternative embodiment, the present invention contemplates that processor 38 in conjunction with memory device 10 is capable of monitoring and temporarily storing a combination of a number of activations and a period of activation for input device 44. In doing so, gaming device 10 can offer any player of the gaming device at least one changed or generated audio, visual, audio-visual, or length of time stimulus as well as combinations thereof at a varying rate based upon a variety of quantity and time combinations of input device 44 activation. Thus, this embodiment of gaming device 10 offers a large possible quantity of changeable gaming experiences for the player.

In further alternative embodiment, the present invention contemplates that input device 44 can be displayed as a mechanical push-button (as shown in FIGS. 1A and 1B) capable of being depressed to register as an activation, preferably by processor 38 and memory device 40. In doing so, this embodiment like the preferred embodiment changes or generates at least one audio, visual, audio-visual, or length of time stimulus as well as combinations thereof by processor 38 when the predetermined or random number of activations of mechanical input device 44 has been completed by a player.

In a still further alternative embodiment, the present invention contemplates that input device 44 can be displayed as a mechanical push-button (as shown in FIGS. 1A and 1B) capable of being depressed to preferably register within processor 38 and memory device 40 as a point in time when input device 44 has been activated. After at least one mechanical input device 44 has been activated for a predetermined period of time, processor 38 changes or generates at least one player stimulus or combinations thereof according to the objectives of the present invention.

In another alternative embodiment, the present invention also contemplates providing a plurality of reels having a plurality of input devices 44 as previously described such that by activating at least one input device 44 also activates another input device 44 as well. Such an embodiment enables the predetermined or random number of activations and/or the predetermined period of time of activation of at least one input device 44 to be reached at a faster rate so that a player may experience at least one changed or generated player stimulus or combinations thereof sooner during gaming play.

In still another alternative embodiment, the present invention contemplates that gaming device 10 can separately contain only one of the auditory, visual, audio-visual, or length of time stimuli to focus upon that particular type of stimulus. For example, gaming device 10 could only contain visual stimuli that would be generated by processor 38 rather than in combination with other auditory, auditory-visual, and length of time stimuli. However, it is preferable for the present invention, that gaming device 10 contain a plurality of auditory, visual, and length of time stimuli.

In yet another alternative embodiment, the present invention contemplates that gaming device 10 can display input device 44 in mechanical or video form and processor 38 can monitor and temporarily store the predetermined or random number of activations or alternatively the predetermined or random period of activation of input device 44 as a component of a base game format, bonus game format, or a combination of both.

As mentioned above, a bonus game is an award generating play of the game other than a combination of the reels giving an award initially. Thus, the predetermined or random number of activations or predetermined or random period of activation of input device 44 could be generated from a base game, a bonus game, or a combination of both to cause processor 38 to change or generate at least one audio, visual, audio-visual, or length of time stimulus as well as combinations thereof.

By allowing the present invention to occur in a base game, bonus game, or a combination thereof, a player has an increased opportunity to enjoy the enhanced gaming experience produced according to the objectives of the present invention.

In a further alternative embodiment of the present invention, at least one stimuli is changed or generated after the gaming device 10 (instead of the player) repeats a function a predetermined number of times. One embodiment of this alternative embodiment includes increasing the reel spin speed after the reels are automatically spun by gaming device 10 or processor 38 at least twice.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is hereby claimed as follows:

1. A gaming device comprising:

at least one game;

at least one player input device;

a plurality of different player stimuli;

a number of consecutive activations of the player input device, wherein the number of consecutive activations is at least two;

a set of instructions for changing the player stimuli upon consecutive activations of the player input device reaching said number of consecutive activations; and a controller which stores said set of instructions and is connected to the player input device, which receives a signal when a player activates the player input device, counts consecutive activations of the player input device, and independent of any events included in play of said game, said controller using said set of instructions generates a same one of the player stimuli upon each player activation of the player input device until the consecutive activations of the player input device reach said number of consecutive activations, and generates a different one of the player stimuli for each of a plurality of subsequent activations of the player input device after the consecutive activations of the player input device reach said number of consecutive activations.

2. The gaming device of claim 1, wherein the number of consecutive activations is changed by the controller when the number of consecutive activations is reached.

3. The gaming device of claim 1, wherein the number of consecutive activations is randomly determined by the controller.

4. The gaming device of claim 1, wherein the player input device includes a wager input device.

5. The gaming device of claim 1, wherein the player input device is selected from the group consisting of a bet one indicator, a bet max indicator, a repeat bet indicator, a bet amount indicator, a play indicator, a select line indicator, and a bet per line indicator.

6. The gaming device of claim 1, wherein the gaming device includes a display device connected to the controller and adapted to display the player input device.

7. The gaming device of claim 6, wherein the display device includes a touch screen.

8. The gaming device of claim 1, wherein the plurality of different player stimuli is selected from the group consisting of an auditory stimulus, a visual stimulus, an audio-visual stimulus, a length of time stimulus, and combinations thereof.

9. The gaming device of claim 8, where the visual stimulus is selected from the group consisting of a changed lighting scheme, a flashing light, an alternating light, a changed reel symbol, a display of a static image, a display of a changed static image, a display of a motion picture, a display of a changed motion picture, a changed reel speed, and combinations thereof.

10. The gaming device of claim 8, wherein the length of time stimulus is a shortened reel spin time or a changed reel spin speed.

11. The gaming device of claim 8, wherein the auditory stimulus is selected from the group consisting of a changed reel spin sound, a changed reel stop sound, a changed input mechanism activation sound, a changed audio clip, a changed reel speed sound, and combinations thereof.

12. The gaming device of claim 1, which further includes at least one reset device connected to the controller, wherein the controller resets the count of consecutive activations when the reset device is activated.

13. The gaming device of claim 12, wherein the reset device includes a cash out indicator.

14. The gaming device of claim 12, wherein the reset device includes a different player input device.

15. The gaming device of claim 12, wherein the reset device is the predetermined number of consecutive activations of the player input device.

16. A gaming device comprising:

at least one game;

at least one player input device;

a plurality of different player stimuli;

a set of instructions for changing the player stimuli upon consecutive activations of the player input device reaching a determined number of consecutive activations, wherein the determined number of consecutive activations is at least two;

a controller which stores said set of instructions and is in communication with the player input device, which receives a signal when a player activates the player input device, counts consecutive activations of the player input device, and independent of any events included in play of said game, said controller generates a first one of the player stimuli upon each player activation of the player input device until the count of the consecutive activations of the player input device equals the determined number, upon which the controller generates a second one of the player stimuli upon at least one subsequent player activation of the player input device; and a reset device in communication with the controller, which when activated causes the controller to reset the count of the consecutive player activations of the player input device.

17. A gaming device comprising:

at least one game;

at least one player input device;

a plurality of different player stimuli;

a predetermined number of consecutive activations of the player input device, wherein the predetermined number of consecutive activations is at least two;

a set of instructions for changing the player stimuli upon consecutive activations of the player input device reaching said predetermined number of consecutive activations; and control means for storing said set of instructions and in communication with the player input device, which receives a signal from the player input device for each player activation of the player input device, includes a counter which counts consecutive activations of the player input device, and independent of any events included in play of said game, said control means using said set of instructions generates a same one of the player stimuli upon each player activation of the input device until the consecutive activations of the player input device reach the predetermined number of consecutive activations, and generates a different one of the player stimuli and resets the counter when the consecutive activations of the player input device reach the predetermined number of consecutive activations.

18. The gaming device of claim 17, wherein the control means includes a processor.

19. The gaming device of claim 17, wherein the predetermined number of consecutive activations of the player input device is changed by the control means when the predetermined number of consecutive activations is reached.

20. The gaming device of claim 17, wherein the predetermined number of consecutive activations is randomly determined by the control means.

21. The gaming device of claim 17, wherein the player input device includes a wager input device.

22. The gaming device of claim 17, wherein the player input device is selected from the group consisting of a bet one indicator, a bet max indicator, a repeat bet indicator, a bet amount indicator, a play indicator, a select line indicator, and a bet per line indicator.

23. The gaming device of claim 17, wherein the player stimuli associated with the player input device is selected from the group consisting of an auditory stimulus, a visual stimulus, an audio-visual stimulus, a length of time stimulus, and combinations thereof.

24. The gaming device of claim 23, wherein the auditory stimulus is selected from the group consisting of a changed reel spin sound, a changed reel stop sound, a changed input mechanism activation sound, a changed audio clip, a changed reel speed sound, and combinations thereof.

25. The gaming device of claim 23, where the visual stimulus is selected from the group consisting of a changed lighting scheme, a flashing light, an alternating light, a changed reel symbol, a display of a static image, a display of a changed static image, a display of a motion picture, a display of a changed motion picture, a changed reel speed, and combinations thereof.

26. The gaming device of claim 23, wherein the length of time stimulus is a shortened reel spin time or a changed reel spin speed.

27. The gaming device of claim 17, which further includes at least one reset device in communication with the control means.

28. The gaming device of claim 27, wherein the reset device includes a cash out indicator.

29. The gaming device of claim 27, wherein the reset device includes a different player input device.

30. The gaming device of claim 27, wherein the reset device is the predetermined number of consecutive activations of the player input device.

31. A gaming device comprising:

at least one game;

at least one player input device;

a plurality of different player stimuli;

a number of consecutive activations of the player input device, wherein the number of consecutive activations is at least two;

a period of time;

a set of instructions for changing the player stimuli upon consecutive activations of the player input device reaching said predetermined number of consecutive activations in said period of time; and a controller which stores said set of instructions and is connected to the player input device, which receives a signal when a player activates the player input device, counts consecutive activations of the player input device, and independent of any events included in play of said game, said controller using said set of instructions generates a same one of the player stimuli upon each activation until the consecutive activations of the player input device reach the number of consecutive activations in the period of time, and generates a different one of the player stimuli when the consecutive activations of the player input device reach the number of consecutive activations in the period of time.

32. The gaming device of claim 31, wherein the number of consecutive activations of the player input device is changed by the controller when the number of consecutive activations is reached.

33. The gaming device of claim 31, wherein the number of consecutive activations of the player input device is randomly determined by the controller.

34. The gaming device of claim 31, wherein the period of time is changed by the controller when the number of consecutive activations is reached.

35. The gaming device of claim 31, wherein the predetermined period of time is randomly determined by the controller.

36. The gaming device of claim 31, wherein the player input device is a wager input device.

37. The gaming device of claim 31, wherein the player input device is selected from the group consisting of a bet one indicator, a bet max indicator, a repeat bet indicator, a bet amount indicator, a play indicator, a select line indicator, and a bet per line indicator.

38. The gaming device of claim 31, wherein the gaming device further includes a display device adapted to display the player input device.

39. The gaming device of claim 38, wherein the display device is a touch screen which enables the player to select the player input device.

40. The gaming device of claim 31, wherein the player stimuli associated with the player input device event is selected from the group consisting of an auditory stimulus, a visual stimulus, an audio-visual stimulus, a length of time stimulus, and combinations thereof.

41. The gaming device of claim 40, wherein the auditory stimulus is selected from the group consisting of a changed reel spin sound, a changed reel stop sound, a changed input mechanism activation sound, a changed audio clip, a changed reel speed sound, and combinations thereof.

42. The gaming device of claim 40, wherein the visual stimulus is selected from the group consisting of a changed lighting scheme, a flashing light, an alternating light, a changed reel symbol, a display of a static image, a display of a changed static image, a display of a motion picture, a display of a changed motion picture, a changed reel speed, and combinations thereof.

43. The gaming device of claim 40, wherein the length of time stimulus is a shortened reel spin time or a changed reel spin speed.

44. The gaming device of claim 31, which further includes at least one reset device connected to the control means.

45. The gaming device of claim 44, wherein the reset device includes a cash out indicator.

46. The gaming device of claim 44, wherein the reset device includes a different player input device.

47. The gaming device of claim 44, where the reset device is the predetermined number of consecutive activations of the player input device.

48. A gaming device comprising:

at least one game;

at least one player input device;

a plurality of different player stimuli;

a set of instructions for changing the player stimuli upon consecutive activations of the player input device in a predetermined period of time equaling the determined number, wherein the consecutive activations of the player input device is at least two;

a controller which stores said set of instructions and is in communication with the player input device, which receives a signal when a player activates the player input device, counts consecutive activations of the player input device, and independent of any events included in play of said game, said controller using said set of instructions generates a first player stimuli upon each player activation of the player input device until the count of the consecutive activations in the determined period of time equals a determined number, and generates a second one of the player stimuli upon at least one subsequent player activation of the player input device; and a reset device in communication with the controller, which when activated causes the controller to reset the count of the consecutive number of player activations of the player input device.

49. A gaming device comprising:

at least one game;

at least one player input device;

a plurality of different player stimuli;

a predetermined number of consecutive activations of the player input device;

a predetermined period of time;

a set of instructions for changing the player stimuli upon consecutive activations of the player input device reaching the predetermined number of consecutive activations in the predetermined period of time, wherein the consecutive activations of the player input is at least two; and control means for storing said set of instructions and in communication with the player input device, which receives a signal from the player input device for each player activation of the player input device, includes a counter which counts consecutive activations of the player input device, and independent of any events included in play of said game, said control means using said set of instructions generates a same one of the player stimuli upon each player activation of the player input device until the consecutive activations of the player input device reach the predetermined number of consecutive activations in the predetermined period of time, and generates a different one of the player stimuli and resets the counter when the consecutive activations of the player input device reach the predetermined number of consecutive activations in the predetermined period of time.

50. The gaming device of claim 49, wherein the control means includes a processor.

51. The gaming device of claim 49, wherein the predetermined number of consecutive activations is changed by the control means when the predetermined number of consecutive activations is reached.

52. The gaming device of claim 49, wherein the predetermined number of consecutive activations is randomly determined by the control means.

53. The gaming device of claim 49, wherein the predetermined period of time is changed by the control means when the predetermined number of consecutive activations is reached.

54. The gaming device of claim 49, wherein the predetermined period of time is randomly determined by the control means.

55. The gaming device of claim 49, wherein the player input device includes a wager input device.

56. The gaming device of claim 49, wherein the player input device is selected from the group consisting of a bet one indicator, a bet max indicator, a repeat bet indicator, a bet amount indicator, a play indicator, a select line indicator, and a bet per line indicator.

57. The gaming device of claim 49, wherein the player stimuli associated with the player input device is selected from the group consisting of an auditory stimulus, a visual stimulus, an audio-visual stimulus, a length of time stimulus, and combinations thereof.

58. The gaming device of claim 57, wherein the auditory stimulus is selected from the group consisting of a changed reel spin sound, a changed reel stop sound, a changed input mechanism activation sound, a changed audio clip, a changed reel speed sound, and combinations thereof.

59. The gaming device of claim 57, where the visual stimulus is selected from the group consisting of a changed lighting scheme, a flashing light, an alternating light, a changed reel symbol, a display of a static image, a display of a changed static image, a display of a motion picture, a display of a changed motion picture, a changed reel speed, and combinations thereof.

60. The gaming device of claim 57, wherein the length of time stimulus is a shortened reel spin time or a changed reel spin speed.

61. The gaming device of claim 57, which further includes at least one reset device connected to the counter.

62. The gaming device of claim 61, wherein the reset device includes an activation of a cash out indicator.

63. The gaming device of claim 61, wherein the reset device includes an activation of a second player input device other than the player input device previously activated.

64. The gaming device of claim 61, wherein the reset device is the predetermined number of consecutive activations of the player input device.

65. A method of changing player stimuli provided to a player of a gaming device independent of any events which occur during game play, the method comprising the steps of:

(a) counting consecutive number of player activations of a player input device;

(b) generating a first player stimuli upon each player activation of the player input device until the player activates the player input device a predetermined number of consecutive times, where the predetermined number of consecutive times is at least two;

(c) generating a second different player stimuli when the player activates the player input device the predetermined number of consecutive times; and (d) resetting said count of the consecutive number of times the player activates the input device.

66. The method of claim 65, wherein resetting said count includes determining another predetermined number of consecutive times.

67. The method of claim 65, which includes resetting the counting of the consecutive number of times a player activates the player input device when a reset device is activated.

68. The method of claim 65, which is operated through a data network.

69. The method of claim 68, wherein the data network is an internet.

70. A method of changing player stimuli provided to a player of a gaming device independent of any events which occur during game play, the method comprising the steps of:

(a) counting consecutive number of player activations player input device;

(b) generating a first player stimuli upon each player activation of the player input device until the player activates the player input device a predetermined number of consecutive times in a predetermined period of time, wherein the predetermined number of consecutive times is at least two; and (c) generating a second player stimuli when the player activates the player input device the predetermined number of consecutive times in the predetermined period of time.

71. The method of claim 70, wherein generating a second player stimuli includes determining another predetermined number of consecutive times.

72. The method of claim 70, wherein generating a second/different player stimuli includes determining another predetermined period of time.

73. The method of claim 70, which includes resetting the counting of the consecutive number of times a player activates a player input device when a reset device is activated.

74. The method of claim 70, which is operated through a data network.

75. The method of claim 74, where in the data network is an internet.

76. A gaming device comprising:

at least one game;

at least one player input device;

a plurality of different player stimuli;

a number of consecutive activations of the player input device, wherein the number of consecutive activations is at least two;

a set of instructions for changing the player stimuli upon consecutive activations of the player input device reaching the number of consecutive activations of the player input device, and generating a different one of the player stimuli for each of a plurality of subsequent activations of the player input device; and a controller which stores said set of instructions and is connected to the player input device, which receives a signal when a player activates the player input device, counts consecutive activations of the player input device, and independent of any events included in play of said game, using said set of instructions, said controller generates a same one of the player stimuli upon each player activation of the player input device until the consecutive activations of the player input device reach said number of consecutive activations, changes the number of consecutive activations when the number of consecutive activations is reached, and generates a different one of the player stimuli for each of a plurality of subsequent activations of the player input device after the consecutive activations of the player input device reach said number of consecutive activations.

77. A gaming device comprising:

at least one game;

at least one player input device;

a plurality of different player stimuli;

a number of consecutive activations of the player input device, wherein the consecutive number of activations is at least two;

a set of instructions for changing the player stimuli upon consecutive activations of the player input device reaching the number of consecutive activations, and generating a different one of the player stimuli for each of a plurality of subsequent activations for the player input device; and a controller which stores said set of instructions and is connected to the player input device, which randomly determines the number of consecutive activations, receives a signal when a player activates the player input device, counts consecutive activations of the player input device, and independent of any events included in play of said game, the controller using said set of instructions generates a same one of the player stimuli upon each player activation of the player input device until the consecutive activations of the player input device reach said number of consecutive activations, and generates a different one of the player stimuli for each of a plurality of subsequent activations of the player input device after the consecutive activations of the player input device reach said number of consecutive activations.

78. A gaming device comprising:

at least one game;

at least one player input device;

a plurality of different player stimuli;

a predetermined number of consecutive activations of the player input device, wherein the predetermined number of consecutive activations is at least two;

a set of instructions for changing the player stimuli upon consecutive activations of the player input device reaching the predetermined number of consecutive activations, changing the predetermined number of consecutive activations when the predetermined number of consecutive activations is reached, and generating a different one of the player stimuli for subsequent activations of the player input device; and control means for storing said set of instructions and in communication with the player input device, which receives a signal from the player input device for each player activation of the player input device, includes a counter which counts consecutive activations of the player input device, and independent of any event included in play of said game, the control means using said set of instructions generates a same one of the player stimuli upon each player activation of the input device until the consecutive activations of the player input device reach the predetermined number of consecutive activations, changes the predetermined number of consecutive activations when the predetermined number of consecutive activations is reached, and generates a different one of the player stimuli and resets the counter when the consecutive activations of the player input device reach the predetermined number of consecutive activations.

79. A gaming device comprising:

at least one game;

at least one player input device;

a plurality of different player stimuli;

a predetermined number of consecutive activations of the player input device, wherein the predetermined number of consecutive activations is at least two;

a set of instructions for changing the player stimuli upon consecutive activations of the player input device reaching the predetermined number of consecutive activations, and generating a different one of the player stimuli for subsequent activations of the player input device; and control means for storing said set of instructions and in communication with the player input device, which randomly determines the predetermined number of consecutive activations, receives a signal from the player input device for each player activation of the player input device, includes a counter which counts consecutive activations of the player input device, and independent of any events included in play of said game, the control means using said set of instructions generates a same one of the player stimuli upon each player activation of the input device until the consecutive activations of the player input device reach the predetermined number of consecutive activations, and generates a different one of the player stimuli and resets the counter when the consecutive activations of the player input device reach the predetermined number of consecutive activations.

80. A gaming device comprising:

at least one game;

at least one player input device;

a plurality of different player stimuli;

a number of consecutive activations of the player input device, wherein the number of consecutive activations is at least two;

a period of time;

a set of instructions for changing the player stimuli upon consecutive activations of the player input device reaching the number of consecutive activations in the period of time, and generating a different one of the player stimuli for subsequent activations of the player input device; and a controller which stores said set of instructions and is connected to the player input device, which receives a signal when a player activates the player input device, counts consecutive activations of the player input device, and independent of any events included in play of said game, the controller using said set of instructions generates a same one of the player stimuli upon each activation until the consecutive activations of the player input device reach the number of consecutive activations in the period of time, changes the number of consecutive activations when the number of consecutive activations is reached, and generates a different one of the player stimuli when the consecutive activations of the player input device reach the number of consecutive activations in the period of time.

81. A gaming device comprising:

at least one game;

at least one player input device;

a plurality of different player stimuli;

a number of consecutive activations of the player input device, where the number of consecutive activations is at least two;

a period of time;

a set of instructions for changing the player stimuli upon consecutive activations of the player input device reaching the number of consecutive activations in the period of time, and generating a different one of the player stimuli for subsequent activations of the player input device; and a controller which stores said set of instructions and is connected to the player input device, which randomly determines the number of consecutive activations, receives a signal when a player activates the player input device, counts consecutive activations of the player input device, and independent of any events included in play of said games, the controller using said set of instructions generates a same one of the player stimuli upon each activation until the consecutive activations of the player input device reach the number of consecutive activations in the period of time, and generates a different one of the player stimuli when the consecutive activations of the player input device reach the number of consecutive activations in the period of time.

82. A gaming device comprising:

at least one game;

at least one player input device;

a plurality of different player stimuli;

a number of consecutive activations of the player input device;

a period of time;

a set of instructions for changing the player stimuli upon consecutive activations of the player input device reaching the number of consecutive activations in the period of time, and generating a different one of the player stimuli upon subsequent activations of the player input device; and a controller which stores said set of instructions and is connected to the player input device, which receives a signal when a player activates the player input device, counts consecutive activations of the player input device, and independent of any events included in play of said game, the controller generates a same one of the player stimuli upon each activation until the consecutive activations of the player input device reach the number of consecutive activations in the period of time, changes the period of time when the number of consecutive activations is reached, and generates a different one of the player stimuli when the consecutive activations of the player input device reach the number of consecutive activations in the period of time.

83. A gaming device comprising:

at least one game;

at least one player input device;

a plurality of different player stimuli;

a number of consecutive activations of the player input device;

a period of time;

a set of instructions for changing the player stimuli upon consecutive activations of the player input device reaching the number of activations in the period of time, and generating a different one of the player stimuli for subsequent activations of the player input device; and a controller which stores said set of instructions and is connected to the player input device, which randomly determines the period of time, receives a signal when a player activates the player input device, counts consecutive activations of the player input device, and independent of any events included in play of said game, the controller using said set of instructions generates a same one of the player stimuli upon each activation until the consecutive activations of the player input device reach the number of consecutive activations in the period of time, and generates a different one of the player stimuli when the consecutive activations of the player input device reach the number of consecutive activations in the period of time.

84. A gaming device comprising:

at least one game;

at least one player input device;

a plurality of different player stimuli;

a predetermined number of consecutive activations of the player input device, wherein the predetermined number of consecutive activations is at least two;

a predetermined period of time;

a set of instructions for changing the player stimuli upon consecutive activations of the player input device reaching the predetermined number of consecutive activations in the predetermined period of time, and generating a different one of the player stimuli for the subsequent activations of the player input device; and control means for storing said set of instructions and is in communication with the player input device, which receives a signal from the player input device for each player activation of the player input device, includes a counter which counts consecutive activations of the player input device, and independent of any events included in play of said game, the control means using said set of instructions generates a same one of the player stimuli upon each player activation of the player input device until the consecutive activations of the player input device reach the predetermined number of consecutive activations in the predetermined period of time, changes the predetermined number of consecutive activations when the predetermined number of consecutive activations is reached, and generates a different one of the player stimuli and resets the counter when the consecutive activations of the player input device reach the predetermined number of consecutive activations in the predetermined period of time.

85. A gaming device comprising:

at least one game;

at least one player input device;

a plurality of different player stimuli;

a predetermined number of consecutive activations of the player input device wherein the predetermined number of consecutive activations is at least two;

a predetermined period of time;

a set of instructions for changing the player stimuli upon consecutive activations of the player input device reaching the predetermined number of consecutive activations in the predetermined period of time, and generating a different one of the player stimuli for subsequent activations of the player input device; and control means for storing said set of instructions and in communication with the player input device, which randomly determines the predetermined number of consecutive activations, receives a signal from the player input device for each player activation of the player input device, includes a counter which counts consecutive activations of the player input device, and independent of any event included in play of said game, the control means using said set of instructions generates a same one of the player stimuli upon each player activation of the player input device until the consecutive activations of the player input device reach the predetermined number of consecutive activations in the predetermined period of time, and generates a different one of the player stimuli and resets the counter when the consecutive activations of the player input device reach the predetermined number of consecutive activations in the predetermined period of time.

86. A gaming device comprising:

at least one game;

at least one player input device;

a plurality of different player stimuli;

a predetermined number of consecutive activations of the player input device;

a predetermined period of time;

a set of instructions for changing the player stimuli upon consecutive activations of the player input device reaching the predetermined number of consecutive activations in the predetermined period of time, and generating a different one of the player stimuli for subsequent activations of the player input device; and control means for storing said set of instructions and in communication with the player input device, which receives a signal from the player input device for each player activation of the player input device, includes a counter which counts consecutive activations of the player input device, and independent of any events included in play of said game, the control means using the set of instructions generates a same one of the player stimuli upon each player activation of the player input device until the consecutive activations of the player input device reach the predetermined number of consecutive activations in the predetermined period of time, changes the predetermined period of time when the predetermined number of consecutive activations is reached, and generates a different one of the player stimuli and resets the counter when the consecutive activations of the player input device reach the predetermined number of consecutive activations in the predetermined period of time.

87. A gaming device comprising:

at least one game;

at least one player input device;

a plurality of different player stimuli;

a predetermined number of consecutive activations of the player input device;

a predetermined period of time;

a set of instructions for changing the player stimuli upon consecutive activations of the player input device reaching the predetermined number of consecutive activations in the predetermined period of time, and generating a different one of the player stimuli for subsequent activations of the player input device; and control means for storing said set of instructions and in communication with the player input device, which randomly determines the predetermined period of time, receives a signal from the player input device for each player activation of the player input device, includes a counter which counts consecutive activations of the player input device, and independent of any events including in play of said game, the control means using said set of instructions generates a same one of the player stimuli upon each player activation of the player input device until the consecutive activations of the player input device reach the predetermined number of consecutive activations in the predetermined period of time, and generates a different one of the player stimuli and resets the counter when the consecutive activations of the player input device reach the predetermined number of consecutive activations in the predetermined period of time.

* * * * *